United States Patent Office 3,427,355
Patented Feb. 11, 1969

3,427,355
PROCESS FOR PREPARING ANILINE AND ALKYL ANILINE
John W. Le Maistre and Albert H. Sherman, Wilmington, Del., assignors to Atlas Chemical Industries, Inc., Wilmington, Del., a corporation of Delaware
No Drawing. Filed June 3, 1966, Ser. No. 555,003
U.S. Cl. 260—580    6 Claims
Int. Cl. C07c 85/10, 87/52

This invention relates to a process for preparing aromatic amines, and, more particularly, to a process for preparing aniline and derivatives thereof.

In accordance with the present invention, aniline and ring substituted alkyl derivatives thereof are prepared directly from nitrocyclohexane and alkyl nitrocyclohexane, respectively, by contacting the nitrocyclohexane or alkyl nitrocyclohexane with a dehydrogenation catalyst at a temperature between about 250° C. and about 500° C.

The reaction may be expressed by the following equation:

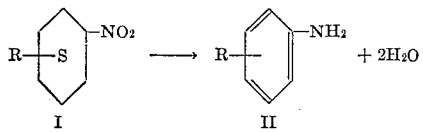

wherein R is hydrogen or a lower alkyl group having from 1 to 4 carbon atoms.

In carrying out the process of the present invention, a compound of Formula I, as such or in solution, may be vaporized in a chamber in the absence or presence of a gaseous carrier such as nitrogen, hydrogen and the like, and the vapor passed into a chamber containing a dehydrogenation catalyst heated to the temperature selected for effecting the reaction, where conversion of the compound of Formula I to the corresponding compound for Formula II occurs. The rate at which the compound of Formula I is passed through the catalyst, that is the contact time, may vary between 0.5 second to over 10 seconds. Generally, the rate of feed is adjusted so as to provide a contact time of from 1 to 8 seconds. After leaving the catalyst chamber, the vapors may be passed through a water cooled condenser and the liquid products collected. The desired product may be recovered from the condensate by distillation under reduced pressure.

The reaction may also be carried out in the liquid phase by charging a compound of Formula I, as such or in solution, and a dehydrogenation catalyst to an autoclave and heating under pressure. A pressure of about 40 to 50 atmospheres and a catalyst concentration of about 0.5 to 2 percent by weight, based on the weight of the compound of Formula I, may be used. The reaction time may be less than about 30 minutes. Longer reaction times may result in decomposition of the compound of Formula I. A preferred method for carrying out the reaction in the liquid phase is to use a continuous flow reactor with a fixed bed of supported catalyst and a contact time of about 1 to 2 minutes.

The catalysts used in the process of this invention belong to the class known in the art as dehydrogenation catalysts. These dehydrogenation catalysts may be used severally, or in combination, as such or extended on supports such as carbon, pumice, clay, bentonite, fuller's earth, silica, alumina, kieselguhr, etc. Typical examples of dehydrogenation catalysts include palladium, platinum, nickel, manganese dioxide, silver, iron, cobalt, rhodium, ruthenium, copper, molybdenum and the like. The preferred catalysts are palladium and platinum.

Typical examples of compounds within the ambit of Formula I are nitrocyclohexane and lower alkyl nitrocyclohexanes such as 1-methyl-4-nitrocyclohexane, 1-ethyl-4-nitrocyclohexane, 1-propyl-4-nitrocyclohexane, 1-butyl-4-nitrocyclohexane, 1-methyl-3-nitrocyclohexane, 1-methyl-2-nitrocyclohexane, 1-ethyl-2-nitrocyclohexane, 1-ethyl-3-nitrocyclohexane, 1-butyl-3-nitrocyclohexane, 1-butyl-2-nitrocyclohexane, 1-propyl-2-nitrocyclohexane and 1-propyl-3-nitrocyclohexane. Typical examples of compounds within the ambit of Formula II are aniline and the ortho, meta, and para ring substituted lower alkyl anilines such as, p-methylaniline, p-ethylaniline, p-propylaniline, p-butylaniline, m-methylaniline, o-methylaniline, o-ethylaniline, m-ethylaniline, m-butylaniline, o-butylaniline, o-propylaniline and m-propylaniline.

The process of this invention is generally operated at temperatures in the range of about 250° C. to about 500° C. Since the best results from the standpoint of reaction rate and yield of desired product are obtained in the range of about 300° C. to about 450° C., this range is regarded as the most useful.

The following examples are illustrative of the present invention and the manner in which it may be practiced, but it is to be understood that such details are given for exemplification purposes and are not to be construed as limiting the scope of the appended claims.

EXAMPLE 1

A 1 inch diameter glass reactor tube was packed with 50 ml. of 1/8 inch pellets of commercial Girdler G–46 catalyst, 1% by weight palladium oxide on alumina, and the remainder of the tube filled with 1/8 inch glass beads. The catalyst was reduced in a stream of hydrogen at about 450° C. and then cooled to about 250° C. in a stream of nitrogen. The flow of nitrogen was adjusted to 12 liters per hour, the catalyst heated to 420° C., and a 20% solution of nitrocyclohexane in benzene was added dropwise to the reactor at a rate of about 30 ml. per hour. The contact time at reaction temperature was about 3 to 4 seconds and the space velocity, corrected to 0° C. and 760 mm. pressure, was 400 hours$^{-1}$. The effluent from the reactor was condensed and collected in a cooled flask. The yield of aniline, based on the nitrocyclohexane added, was 53%.

EXAMPLE 2

Example 1 was repeated except that the temperature of the catalyst was 360° C. instead of 420° C. The yield of aniline was 40%, based on the nitrocyclohexane added.

EXAMPLE 3 p-Methylaniline is prepared by following the procedure of Example 1 except that 1-methyl-4-nitrocyclohexane is added to the reactor instead of a solution of nitrocyclohexane.

EXAMPLE 4 m-Butylaniline is prepared by following the procedure of Example 3 except that 1-butyl-3-nitrocyclohexane is added to the reactor instead of 1-methyl-4-nitrocyclohexane.

The following procedure was used in Examples 5–14. A 1 inch diameter glass reactor tube was packed with 50 ml. of the indicated catalyst to form a catalyst bed and the remainder of the tube was filled with 1/8 inch glass beads. Nitrogen was passed through the reactor tube at the rate of 12 liters per hour. The catalyst was heated to the indicated temperature and a 20% solution of nitrocyclohexane in benzene was added dropwise at a rate of 30 ml. per hour. The contact time at reaction temperature was about 3 to 4 seconds and the space velocity, corrected to 0° C. and 760 mm. pressure, was 400 hours$^{-1}$. The effluent from the reactor was condensed and collected in a cooled flask. The yield of aniline reported was based on the weight of nitrocyclohexane added.

| Example Number | Catalyst | Temperature, °C. | Percent Yield of Aniline |
|---|---|---|---|
| 5 | 1% Pt on Al₂O₃ | 434 | 20 |
| 6 | 1% Pt on Al₂O₃ | 365 | 28 |
| 7 | Nickel | 334 | 28 |
| 8 | do | 429 | 18 |
| 9 | MnO₂ on Al₂O₃ | 403 | 22 |
| 10 | MnO₂ on Al₂O₃ | 306 | 15 |
| 11 | 5% Ag on SiO₂ | 300 | 12 |
| 12 | 5% Ag on SiO₂ | 380 | 20 |
| 13 | 5% Ag on SiO₂ | 487 | 28 |
| 14 | 5% Ag on SiO₂ | 495 | 18 |

The products of the present invention are known and are used commercially in the dye industry. Aniline, for example, may be oxidized in dilute acid solutions with sodium dichromate and copper sulfate to produce a widely used black dye known as "aniline black."

Having described the invention, what is desired to be secured by Letters Patent is:

1. The process for preparing aniline and ring substituted lower alkyl aniline which comprises contacting a compound selected from the group consisting of nitrocyclohexane and lower alkyl nitrocyclohexane with a dehydrogenation catalyst at a temperature between about 250° C. and about 500° C.

2. The process of claim 1 wherein the compound is nitrocyclohexane.

3. The process of claim 2 wherein vaporized nitrocyclohexane is contacted with the catalyst.

4. The process of claim 3 wherein the vaporized nitrocyclohexane is contacted with the catalyst at a temperature between about 300° C. and about 450° C.

5. The process of claim 3 wherein the catalyst is palladium.

6. The process of claim 3 wherein the catalyst is platinum.

References Cited

UNITED STATES PATENTS 3,354,212   11/1967   Donanima.

CHARLES B. PARKER, *Primary Examiner.*

PATRICIA C. IVES, *Assistant Examiner.*

U.S. Cl. X.R.

260—578, 696